Figure 1:
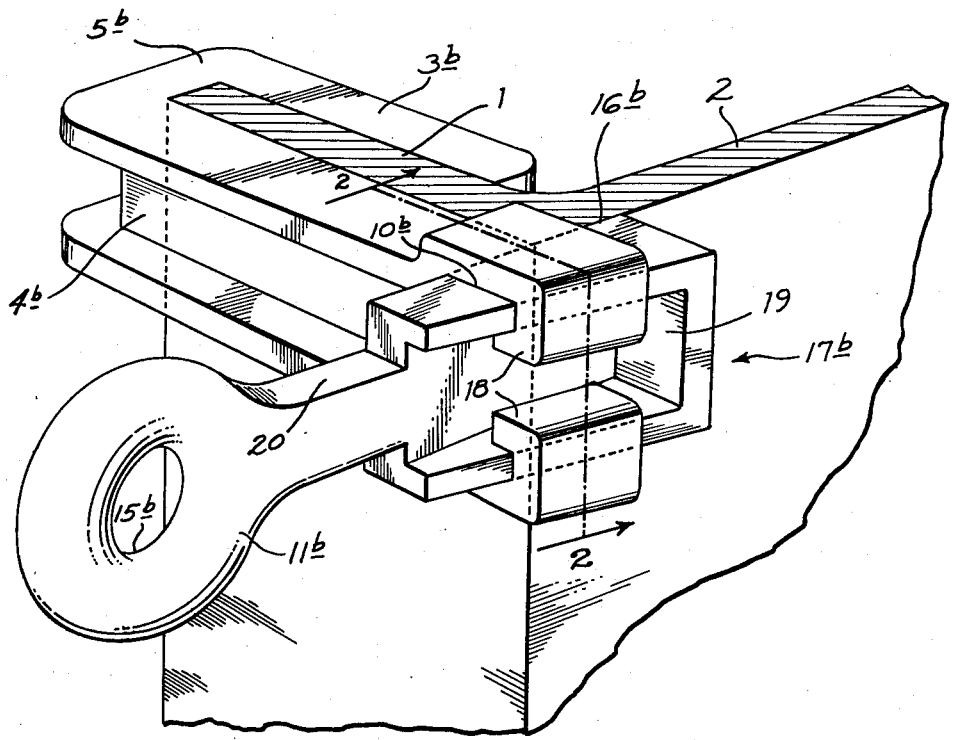

Aug. 10, 1954  W. A. MEIGHAN ET AL  2,685,848
SLOTTED TUNNEL SHIP CLAMP
Filed Oct. 15, 1951

INVENTOR.
William A. Meighan
and Tirey L. Hume
BY
Atty.

Patented Aug. 10, 1954

2,685,848

UNITED STATES PATENT OFFICE 2,685,848

SLOTTED TUNNEL SHIP CLAMP

William A. Meighan, Oswego, and Tirey L. Hume, Portland, Oreg.

Application October 15, 1951, Serial No. 251,413

4 Claims. (Cl. 105—369)

This invention relates to a two piece ship clamp for gripping both the web and inboard flange of a ship hull rib so that cables or straps can be secured thereto and stretched across the ship hold or attached to pieces of cargo to inhibit cargo shift. Specifically, this invention is a division of our copending application Serial Number 166,495, now Patent No. 2,675,265, dated April 13, 1954, filed June 6, 1950 and entitled Ship Clamp.

One object of our invention is to provide a two piece ship clamp which requires a minimum application of force to effect an initial grip on the hull rib so that a workman may fix the clamp in place while he swings precariously from a sling or stands upon other insecure support.

All ocean-going cargo vessels must be protected against the ever present danger that the cargo being transported may shift about and cause the vessel to list. This danger, if allowed to materialize during a storm or the running of a high sea, may cause the cargo to slide or shift about in the hold and change the ship's center of gravity as the ship pitches or rolls from side to side. In extreme cases, a cargo of fungible goods has been known to flow to one side causing the ship to list or heel dangerously. With non-fungible or concentrated pieces of cargo, such as heavy machinery, damage is produced when the machinery breaks loose and slides about in the hold. The conventional provisions against such cargo shift vary with the cargo type. Thus, with heavy machinery or other concentrated pieces of cargo, heavy cables or metal straps are secured between the individual pieces of cargo and the hull ribs or deck cleats. With a fungible cargo, however, the hold conventionally is divided into two or more smaller inner-connected compartments by forming a temporary fore-and-aft bulkhead or baffle network across the hold with spaced timbers or planks. The fungible cargo is then loaded by being discharged over this temporary structure so timbers divide the fungible mass and serve as baffles to inhibit lateral movement thereof.

Before the price of timber rose to its present high level, temporary bulkheads or baffles were secured in place with transverse timber "shoring" members. Recently, however, this timber "shoring" has been eliminated by securing the vertical baffle plates to the ship ribs with metal straps or cables. Whatever type of cargo is to be secured against shifting, it will be noted that some means must be provided to secure the metal straps or cables to the ship hull ribs. That is to say, a ship clamp is required which will engage the flange and web of a hull rib and secure a metal strap or cable in place whether the metal strap or cable is holding a concentrated piece of cargo or is holding a fungible cargo baffle plate. It is toward an improvement in this type of ship clamp which our invention is directed.

The ribs of a ship are elongated vertical members, usually Z-bars, channels, or bulb bars, to which the skin of the ship is welded or riveted. In any event, as viewed from the inside of the hold, a typical rib is formed with an outboard flange secured to the skin, a web arranged to lie perpendicular to the plane of the skin, and an inboard flange spaced from and parallel to the skin. The typical ship clamp overlies the inboard flange and a portion of the web and is secured thereto with a wedge, set screw, or pair of jaws. A hook or eye usually protrudes from the end of the clamp in order that a strap or cable may be secured thereto. One disadvantage which we have found to exist in the conventional ship clamp resides in the means provided to secure the clamp to the hull rib. Thus, the hold of a ship may be quite deep and, in lining the hold or constructing the temporary timber baffles, a workman must be supported by temporary staging, suspended from a sling, or otherwise insecurely positioned adjacent the hull ribs to work thereon. In such a precarious position, it is difficult to thread a heavy screw or nut and cinch it tight, strike a heavy hammer blow or exert a large leverage with a prybar. Therefore, the conventional ship clamp, with its associated set screw or wedge and inherent heavy construction, is difficult to secure in place. Furthermore, the distance between the ship skin and inboard rib flange is often nine inches or less. Such a restricted distance limits the amount of force which can be generated to secure the ship clamp in place with a blow from a maul. Accordingly, one object of our invention is to provide a ship clamp which is secured in place on a hull rib in two separate operations the first of which easily can be accomplished by a workman confined to a small work area while suspended from a sling. The first step practiced to secure our clamp involves a mere tacking operation so the clamp will not slide down the vertical rib. Thus, a workman need not attempt to thread a heavy set screw or nut or drive a maul while supported precariously. The second step follows automatically after the workman has been hauled to safety. When a cable or strap is placed in the hook or eye of the clamp and tensioned, as with a "comealong," the tension increases the grip of our ship clamp on the rib and securely fastens the same in place.

One object of our invention is to provide a two piece ship clamp for gripping the web and inboard flange of a hull rib, which clamp is provided with a tunnel in the terminal end thereof for increasing the grip of the clamp on the rib when a pull is applied substantially parallel to the tunnel axis.

Another object of our invention is to provide a clamp for a structural member, which clamp carries a tunnel for cooperation with an elongated keeper member. These elements are tapered complementarily so the keeper, in sliding through the tunnel, will increase the grip of the clamp on the structural member in direct proportion to the amount of pull applied to the keeper member.

Yet another object of our invention is to provide the tunnel of a ship clamp with spaced flanges defining a slot and to provide the keeper of such a clamp with a recessed portion complementary to the slot. Thus, assembly of these two clamp pieces is facilitated since the keeper merely is inserted laterally through the slot, rotated 90°, and pulled forward to effect an initial tacking or locating placement.

Figure 2:
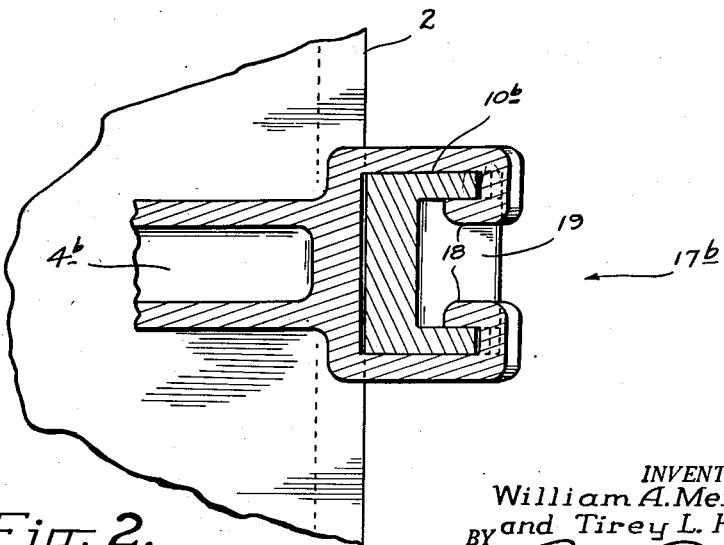

These and other objects and advantages of our invention will appear in the following detailed description taken in connection with the accompanying drawings, in which:

Fig. 1 is a perspective view, with a hull rib or similar structural member shown partially in section, indicating the manner in which our slotted tunnel ship clamp grips both the flange and web of the hull rib or structural member, said view being taken with the keeper member in fully extended and in full gripping position; and Fig. 2 is a section view, taken substantially on the line 2—2 of Fig. 1, showing the manner in which the keeper member bears upon the flange of the hull rib to apply purchase to the ship clamp, the amount of overlap of the web of the rib having been exaggerated slightly for clarity.

As shown, our invention is adapted to grip a ship hull rib or other structural member having an inboard flange 1 and a web 2. To this end, a two piece clamp is provided and the first piece is defined by a U-shaped body having a first or short outboard leg 3b and a second or long inboard leg 4b joined by a connecting section 5b. These legs are parallel and are spaced one from another a distance substantially equal to the thickness of the flange 1. Thus, the short leg 3b has an overall length less than the length of the flange so the connecting end section 5b will abut the end of the flange when a purchase is applied to the clamp through the tapered tunnel 10b as hereinafter will be described.

The second piece of the two piece clamp is defined by an elongated keeper member 11b which is provided with an eye 15b at one end and with a rear tool engaging face 17b at the other end.

Turning now to a comparison of Figs. 1 and 2, it will be seen that the tunnel 10b and the keeper 11b are tapered in a complementary configuration and the inner face of the keeper is provided with an elongated jaw or flat contact portion 16b. Further as indicated by the exaggerated overlap in Fig. 2, the effective length of the long leg 4b is such that the left wall of the tunnel 10b overlaps the web 2. That is to say, the tunnel is four-sided and the effective length of the long leg 4b, from the left wall of the tunnel to the connecting section 5b, is less than the length of the flange 1 whereas the effective length, from the opposite or right wall of the tunnel to the connecting section 5b, is greater than the flange length. Accordingly, when the rear tool engaging face 17b is tapped lightly with a hammer or is moved with a slight prybar pressure, the tapered keeper member 11b is caused to contact both the tunnel 10b and the web 2. Thus, the flat jaw 16b comes to grip with the rib initially to tack the clamp in place. Thereafter, an increased pull on the eye 15b or an increased push on the face 17b will force the connecting section 5b more tightly against the end of flange 1. Furthermore, the greater the force that is exerted upon the tool engaging face 17b or hook 15b, the tighter the keeper member will be wedged between the side of tunnel and the web to secure the ship clamp in place.

It will be noted, as shown in Fig. 1, that the axis of the tapered tunnel 10b is arranged substantially perpendicular to the plane of the flange 1. Thus, the effective axis of the keeper member 11b also is perpendicular to the flange in the operative position of the former. However, to accommodate assembly of the two pieces of the clamp, one wall of the tapered tunnel 10b is slotted and turned in as defined by the twin flanges 18. Further, the keeper 11b is recessed at 19 to provide two tapered tracks or guides which are complementary to the tapered portions of the tunnel above and below the flanges 18. The shank of the keeper, in turn, is narrowed or reduced at 20 to define a reduced portion complementary to the slot in the tunnel.

In use, the U-shaped body 3b, 4b, 5b is placed in position about the end of the flange 1 with the keeper 11b kept separate. Thereafter, the keeper 11b is assembled with the body by inserting the reduced shank portion 20 through the slot intermediate the flanges 18 and rotating the keeper 90°, the fit of these parts being loose enough to permit such assembly. Thereafter, the eye 15b is pulled, as with a wire rope or cable inserted therethrough, or the rear-tool engaging face 17b is tapped or pried to effect an initial grip. This causes the jaw 16b to be forced against the web 2 while the opposite side of the keeper slides in the tunnel and applies purchase to the leg 4b to draw the connecting section 5b against the end of the flange 1. Finally, after the workman has been hauled to safety, the wire rope or cable is tensioned so as to draw the eye 15b and the keeper 11b through the tapered tunnel. The tighter this tension, the tighter the connecting section 5b will grip the flange.

Our invention is of particular utility when employed to secure metal straps or cables to the ribs of a cargo vessel in that the novel features thereof allow a workman to tack or fix the ship clamp in position while the worker is suspended from a sling or other insecure support. Thus, in accord with the objects of our invention, we have provided a two-piece ship clamp which grips the web and flange of a hull rib and which is provided with a tunnel means for increasing the grip of the clamp on the rib web when a force is applied perpendicular to the plane of the rib flange. We have further provided a ship clamp with an elongated tapered keeper member which coacts with a tapered tunnel to grip the web of a hull rib and obtain purchase therefrom to draw the clamp against the rib flange. Each of these advantages and objects is cumulative in providing a ship clamp which requires a minimum application of force to effect an initial grip on a cargo hull rib yet which grips more tightly as an increased strain is imparted thereto.

We claim:

1. A two piece ship clamp for gripping the web and inboard flange of a ship hull rib, comprising a U-shaped body having one short leg and one long leg joined by a connecting section, said legs being substantially parallel and being spaced the approximate thickness of said flange to adapt the faces of said legs to closely encompass the flange with the connecting section gripping the flange end, said long leg terminating in a tapered tunnel the axis of which lies substantially perpendicular to the plane of said flange, said tunnel having a U-shaped flanged lateral slot through one wall defining an initial insertion opening, and an elongated tapered keeper having a recess portion complementary to said U-shaped flanged slot adjacent one end for insertion through said opening and being slidably mounted in said tapered tunnel, said keeper carrying jaw means adjacent the outboard end thereof adapted to grip said web for applying purchase to said tunnel and long leg in a direction drawing said connecting section against the end of said flange, the inboard end of said tapered keeper terminating in a closed eye engagement means for pulling said keeper into said tunnel to increase the grip of said clamp on said flange and web.

2. A two piece clamp for gripping the flange and web of a structural member, said clamp comprising; a first piece defined by a U-shaped body having parallel first and second elongated legs joined by a connecting end section, said legs being spaced a distance substantially equal to the thickness of said flange, said second leg terminating in a non-circular tapered tunnel the axis of which is arranged perpendicular to the plane of said second elongated leg, that wall of said non-circular tunnel which is most distant from said connecting section being pierced by an elongated slot which is arranged substantially parallel said tunnel axis, and a second piece defined by an elongated non-circular keeper which is complementary to said non-circular tunnel, slidably to fit therein and frictionally to engage a portion thereof, one portion of said keeper defining an elongated flat jaw means for gripping said web when purchase is applied to the keeper by the frictional engagement of the keeper and tunnel.

3. A two piece clamp for gripping the flange and web of a structural member, said clamp comprising; a first piece defined by a U-shaped body having parallel first and second elongated legs joined by a connecting end section, said legs being spaced a distance substantially equal to the thickness of said flange, said second leg terminating in a non-circular tapered tunnel the axis of which is arranged perpendicular to the plane of said second elongated leg, that wall of said non-circular tunnel which is most distant from said connecting section being pierced by an elongated slot which is arranged substantially parallel said tunnel axis, a second piece defined by an elongated non-circular keeper which is complementary to said tunnel slidably to fit therein and frictionally to engage a portion thereof, one portion of said keeper defining an elongated flat jaw means for gripping said web when purchase is applied to the keeper by the frictional engagement of the complementary keeper and tunnel, and a reduced portion recessed in one end of said keeper, said reduced portion being complementary to said elongated slot to allow lateral insertion or removal of said keeper into or out of said tunnel.

4. A two piece clamp for gripping the flange and web of a structural member, said clamp comprising; a first piece defined by a U-shaped body having one short leg and one long leg joined by a connecting end section, said legs being parallel and being spaced a distance substantially equal to the thickness of said flange, said short leg having a length less than the length of said flange to adapt the legs closely to encompass the flange with the connecting end section abutting the end of the flange, said long leg terminating in a four walled tapered tunnel the axis of which lies parallel the plane including both of said legs, the effective length of said long leg from one wall of said tunnel to said connecting section being less than the length of said flange and the effective length from the opposite wall of said tunnel to said section being more than the flange length, said tunnel opposite wall being pierced by an elongated slot, and a second piece defined by an elongated keeper means tapered complementarily to said tunnel slidably to fit therein, said keeper having a recessed portion complementary to said elongated slot for inserting said second piece in said first piece.

References Cited in the file of this patent

UNITED STATES PATENTS

| Number | Name | Date |
|---|---|---|
| 1,210,206 | Riegler | Dec. 26, 1916 |
| 1,313,747 | Sims | Aug. 19, 1919 |
| 1,332,442 | Kane | Mar. 2, 1920 |
| 2,429,969 | Wasco | Oct. 28, 1947 |
| 2,609,761 | Clark | Sept. 9, 1952 |

FOREIGN PATENTS

| Number | Country | Date |
|---|---|---|
| 152,473 | Great Britain | Oct. 21, 1920 |